United States

Koch

[15] 3,684,354

[45] Aug. 15, 1972

[54] IMAGE GATE

[72] Inventor: Rochne E. Koch, Milwaukee, Wis.

[73] Assignee: General Electric Company

[22] Filed: Oct. 30, 1970

[21] Appl. No.: 85,654

[52] U.S. Cl. ............350/289, 250/213 VT, 350/171
[51] Int. Cl. ...........................................G02b 27/14
[58] Field of Search ..95/42; 350/288, 289, 169, 171; 250/71.5 S, 213 VT, 77

[56] References Cited

UNITED STATES PATENTS

| | | | |
|---|---|---|---|
| 3,546,461 | 12/1970 | Craig | 250/77 X |
| 3,439,114 | 4/1969 | Taylor | 250/77 X |
| 3,532,044 | 10/1970 | Shimomura | 95/42 |
| 2,539,499 | 1/1951 | Walters et al. | 95/42 |

*Primary Examiner*—David Schonberg
*Assistant Examiner*—John W. Leonard
*Attorney*—Arthur V. Puccini, Jon Carl Gealow, Frank L. Neuhauser, Oscar B. Waddell and Joseph B. Forman

[57] ABSTRACT

An image gate is used for selectively directing the optical image from an X-ray image intensifier tube to cameras located on the sides of and in line with the optical image path. The image gate has semitransparent mirrors which park substantially upright in juxtaposition to the optical path. Either mirror may be shifted to a diagonal position in the beam path so as to transmit an image in one direction and reflect an image in another. A quick acting damping mechanism shifts each mirror on a combination of straight guide rods and guide tracks which have curved and straight portions. The mirror portion near the camera lens first follows a hyperbolic arc around the camera lens to obtain the desired diagonal position and is then shifted sideways to clear the lens with a minimum space requirement. Means are provided to lock the mirrors in their parked position so that the image gate may be used in various positions without danger of the mirrors shifting when not engaged by the drive mechanism.

12 Claims, 5 Drawing Figures

PATENTED AUG 15 1972

Inventor
Rockne E. Koch
By
Attorneys

IMAGE GATE

BACKGROUND OF THE INVENTION

X-ray image intensifier tubes are used in diagnostic X-ray systems to convert an X-ray image into a bright optical image. The optical image appears on an output fluorescent screen within the image intensifier tube. A collimating objective lens is used to direct the light rays from the screen along an optical image path.

The system is usually provided with various means for the radiologist to visualize the optical image or record it on film. For instance, the optical image may be directed to a t.v. camera and displayed on a monitor or the image may be directed to a magnifying lens and mirror system for direct viewing. A cinerecording camera and a spot film camera are also usually provided so that action and still photographs, respectively, can be made.

The most common method of selectively directing the optical image into the cameras or along a direct viewing path is to use one or more semitransparent mirrors which can be moved from outside the beam to a diagonal position in the beam path in which case some of the image light is reflected along one path to a camera and the remainder of the light is transmitted through the mirror to another camera or along a direct viewing path. The lenses of the various cameras are desirably placed as near as possible to the objective lens by extending them into a light tight housing in which the mirrors and mechanism for transferring the mirrors are located. The greater the distance of the camera lenses from the objective lens, the grater will be the vignetting or light loss from the margins of the optical image.

Heretofore, the mirrors were parked in the image gate housing to the side of the optical image path and the mirrors were swung edgewise and bodily into the path when their use was desired. This method required that the image gate housing be enlarged by almost the full width of the mirrors so that they could be selectively parked above the objective lens and outside of the image path. The arrangement resulted in the camera lenses being spaced further from the objective lens of the image intensifier in which case a large amount of vignetting occurred. Prior systems were usually, if not always, restricted to use of one camera such as for cine or spot filming and the remainder of the limited space available was used for parking and moving the semitransparent mirror.

SUMMARY OF THE INVENTION

An object of the present invention is to overcome the disadvantages and problems mentioned above in respect to prior image gates.

Particularly, it is an object of this invention to provide an image gate which is compact and has all of the recording camera and t.v. camera lenses very close to the objective lens of the image intensifier tube so that vignetting and light loss are reduced. A corollary to this object is the use of less radiation on the patient to obtain an intensified image that is without vignetting and is satisfactorily bright at its edges.

Another object of the new image gate is to permit use of two recording cameras plus a t.v. camera in the same viewing system.

A further object of this invention is to provide an image gate wherein the image directing mirrors are normally parked in juxtaposition to the optical path extending from the image tube objective lens but which mirrors are selectively moved edgewise first in a curved hyperbolic path to a diagonal position after which they are shifted straight into final position along a rectilinear path with the plane of the mirror maintaining parallelism with its first diagonal position. In other words, the mirrors are slid into place and not swung.

A still further object is to provide a mechanism that moves a mirror at high speed when it is in motion between its parked and active positions and which decelerates the mirror as it approaches its active position to thereby minimize shock and vibration in the system.

Yet another object of the invention is to provide a mirror shifting mechanism which requires only a single drive motor.

Another object is to provide an image gate which may be used in vertical, horizontal, or any orientation without gravity adversely affecting the position of any of the mirrors nor their transfer time.

Briefly stated, the new image gate comprises a housing on the inside of which are mounted a pair of curved guide tracks and a pair of straight guide rods. A guide shaft extends laterally from near one end of each mirror into the guide tracks. A shaft extending laterally from near the middle of the mirror engages with a slotted geneva-type transfer lever which may be swung under the influence of a motor to move the mirror initially along a hyperbolic path to attain a diagonal position and then in a straight path toward its final position. A transfer lever is provided for each mirror and each lever is swung under the influence of a reversible driving link. Means are provided to lock the transfer levers and hence, the mirrors, in their parked positions.

How the above mentioned objects and other more specific objects are achieved will appear from time to time throughout the course of the ensuing description of a preferred embodiment of the invention taken in conjunction with the drawing.

DESCRIPTION OF A PREFERRED EMBODIMENT

Figure 1:
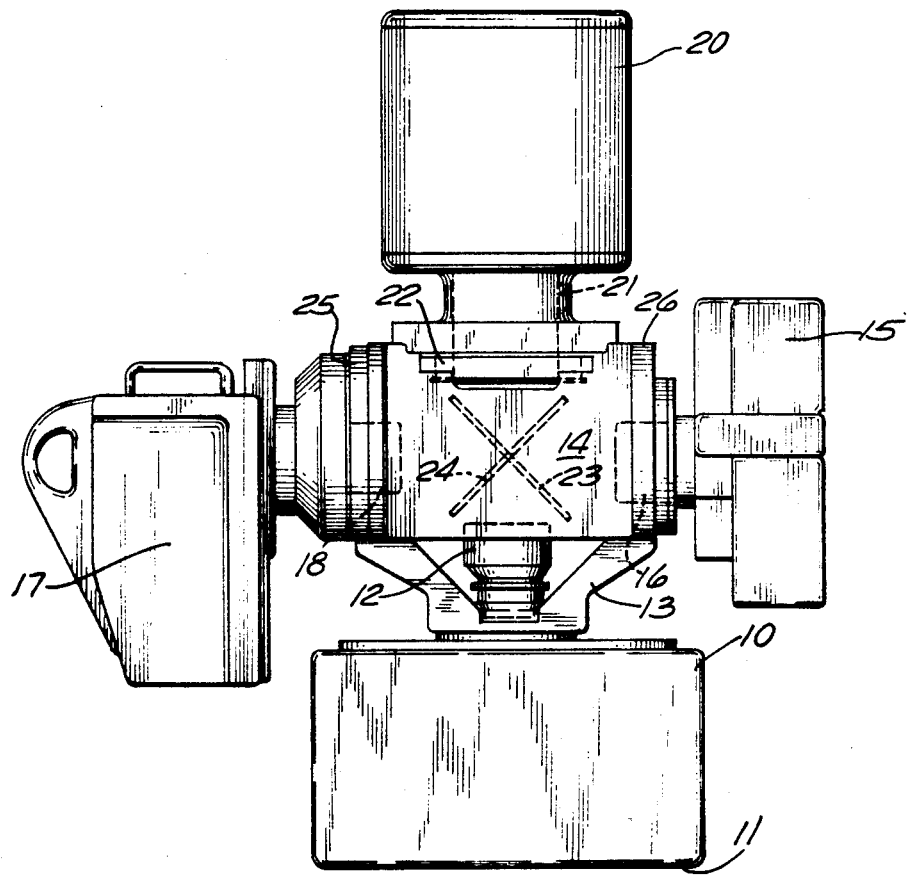
FIG. 1 is an elevation view of an X-ray image intensifier system including an image intensifier, two recording cameras, a t.v. camera and the new image gate.

The general arrangement of an X-ray image intensifier system in which the new image gate is used is shown in FIG. 1. The housing for the X-ray image tube is marked with the numeral 10. The image intensifier housing 10 may be supported over a patient who is resting on an X-ray table in which there is an X-ray tube that projects its rays upwardly. The patient, X-ray table and tube are not shown because they are conventional.

The image intensifier housing 10 and its associated components may also be built into the X-ray table in which case the housing would be inverted in the table and the X-ray tube would be supported over the table. In either case, an X-ray image of part of the patient's anatomy enters the intensifier housing through its bottom face 11 and is converted in the intensifier tube to a minified but bright optical image in a well known manner. The optical image formed on the image tube output fluorescent screen is directed therefrom by a collimating objective lens assembly which is inside a lens barrel, 12. Thus, the collimated optical image is directed upwardly in FIG. 1 unless otherwise deflected.

The image tube housing 10 has an adapter 13 for supporting a cubical image gate housing 14 which is merely outlined in this figure. The shroud for excluding light from the image gate housing has been omitted for the sake of clarity in the various views.

A spot film camera 15 is mounted on the right side of the image gate with the lens barrel 16 of this camera extending into the image gate housing. A cinerecording camera 17 is mounted on the left side of the image gate housing 14 with the lens barrel 18 of this camera also extending into the image gate housing.

Mounted on top of image gate housing 14 is a t.v. camera 20. A lens barrel 21 extends from the t.v. camera 20 and terminates in a servo iris 22 which extends into the image gate housing.

Shown in dashed lines within image gate housing 14 are two mirrors 23 and 24 which are positioned diagonally with respect to the optical image beam which projects vertically from the image intensifier's lens barrel 12. Normally only one mirror would be in a diagonal position at any one time and the other would be parked to the side in a nearly vertical position. These mirrors are semi-transparent as a result of their lower surfaces having a thin coating of reflective metal which also transmits some light. Mirror 24 is positioned in FIG. 1 for reflecting part of the optical image light into lens barrel 16 of camera 15. In this diagonal position mirror 24 also transmits some of the image light to servo iris 22 behind which there is the lens barrel 21 of t.v. camera 20. The other mirror 23 is positioned at an opposite diagonal so that the image light is split between that which is reflected to lens barrel 18 of cinerecording camera 17 and that which is transmitted to the t.v. camera. As will be explained, these mirrors are normally parked in a substantially vertical position in juxtaposition with the optical image beam emerging from the image intensifier objective lens barrel 12. The mechanism for transferring the mirrors from their parked to their diagonal or active positions and the image gate as a whole constitute the principal new subject matter disclosed herein.

The cameras may be variously mounted with respect to image gate housing 14 but in this case they are mounted on apertured plates 25 and 26 which are in turn anchored on adapter 13 on top of the image tube housing 10. The details for detachably mounting the cameras are not shown.

Attention is now invited to FIGS. 2 – 5 in connection with which the details of the new image gate will be described. In FIG. 4 one may see that the image gate housing is essentially a box with an open top. The box has a cast metal bottom 27 in which there is a large circular aperture 28. A front wall 29 and a rear wall 30 of the box comprise relatively heavy metal plates and the sidewalls 31 and 32 are of thinner sheet metal. The walls may be joined together at their corners to form a box with any suitable fastening means. The box serves in one respect as a chassis or support means on which the t.v. camera and the mirror mechanism is mounted.

Figure 2:
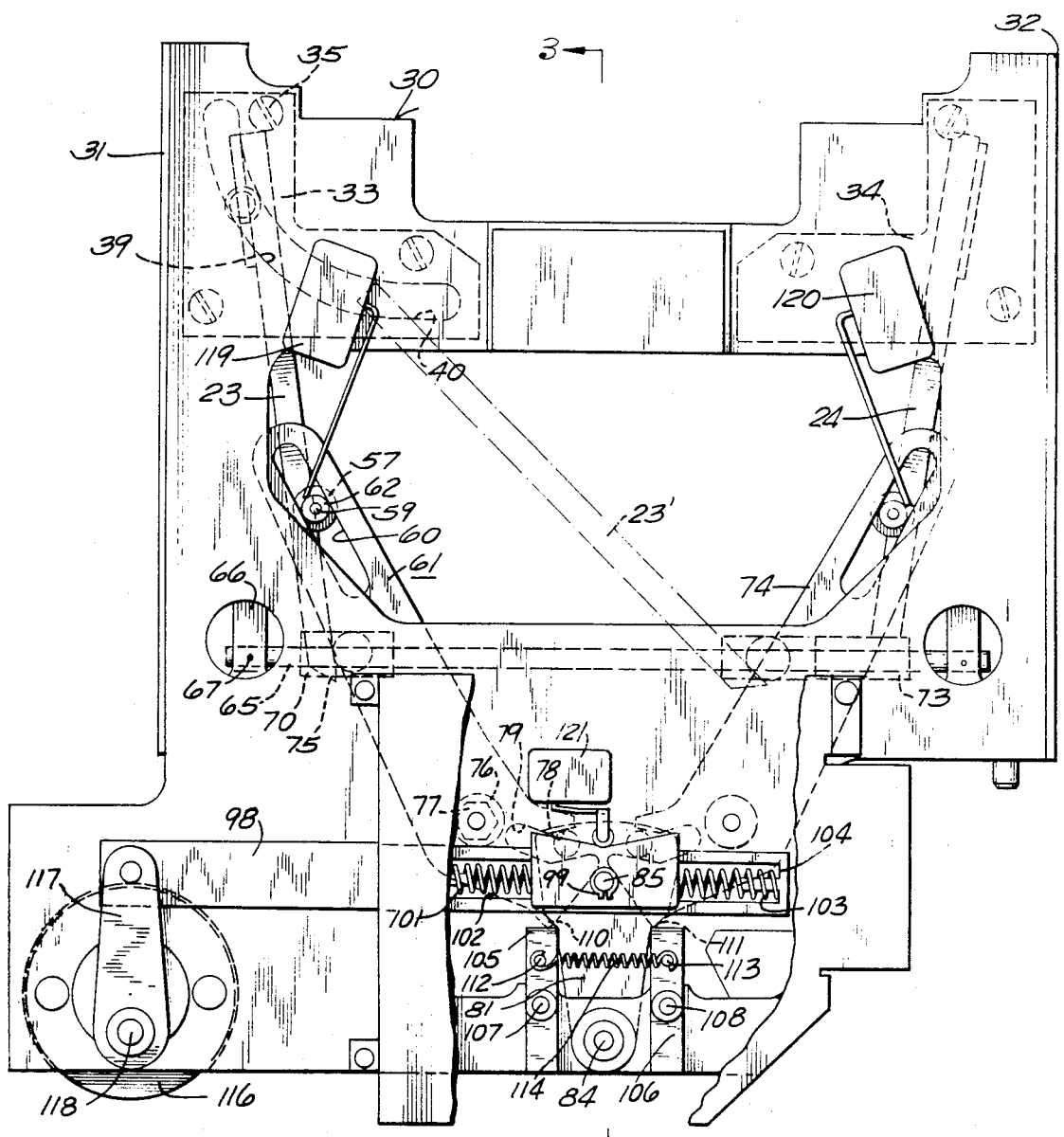
FIG. 2 is a side elevation of the image gate with parts broken away.

FIG. 2 permits viewing the interior of the box-like image gate housing as a result of the front being partially broken away. On the back wall 30 are mounted a pair of mirror guide track elements 33 and 34 which are equidistant from center. Only guide track element 33 will be described in detail since it is similar to its counterpart 34. Guide track element 33 is a flat plate which is spaced away from rear wall 30 on cylindrical spacers 35, for example, and secured tightly by means of screws 36 which thread into spacer element 35. The guide tracks are desirably mounted on spacers 35 which have clearance between the spacers and the side plates 29 and 30 to permit accurate positioning of the guide tracks and allowing accurate setting of the desired diagonal angle before the tracks are clamped tightly.

Guide track element 33 has a curved through-slot 39 which is shaped as a segment of a circle or a hyperbola over most of its length but terminates in a confluent essentially straight section 40 at its lower end. The straight section 40 of slot 39 is parallel to a horizontal plane as viewed in FIG. 2. The reason for the upper part of slot 39 being curved and the terminal part being straight is, as will appear, to transfer semitransparent mirror 23 from juxtaposition with the optical path leading from the objective lens first downwardly and to the right and then exclusively to the right in a horizontal plane when the mirror is being transferred from its parked to its active position. This minimizes the amount of space required to store and transfer the mirrors.

Figure 3:
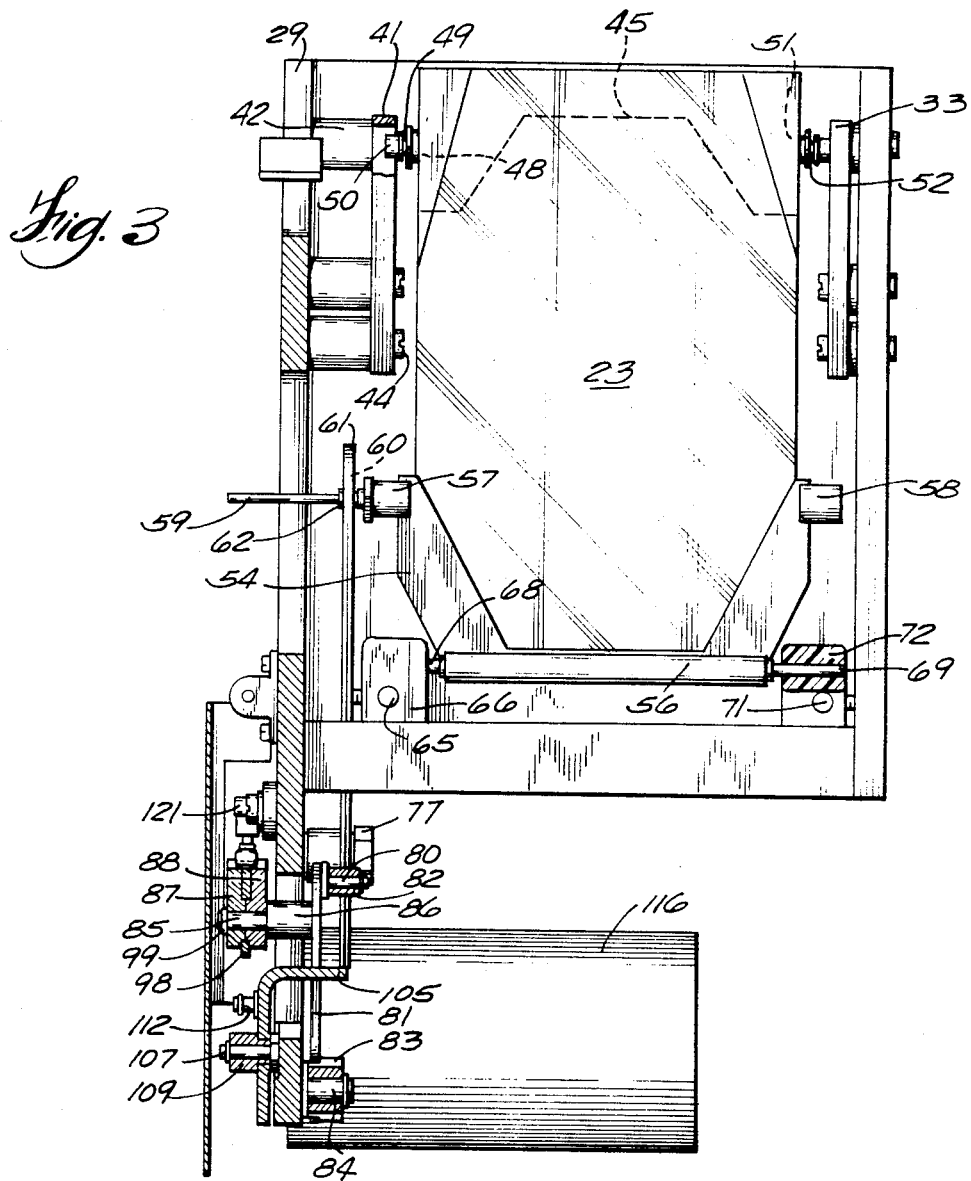
FIG. 3 is a vertical cross section taken through the image gate on the plane 3—3 of FIG. 2.
Figure 4:
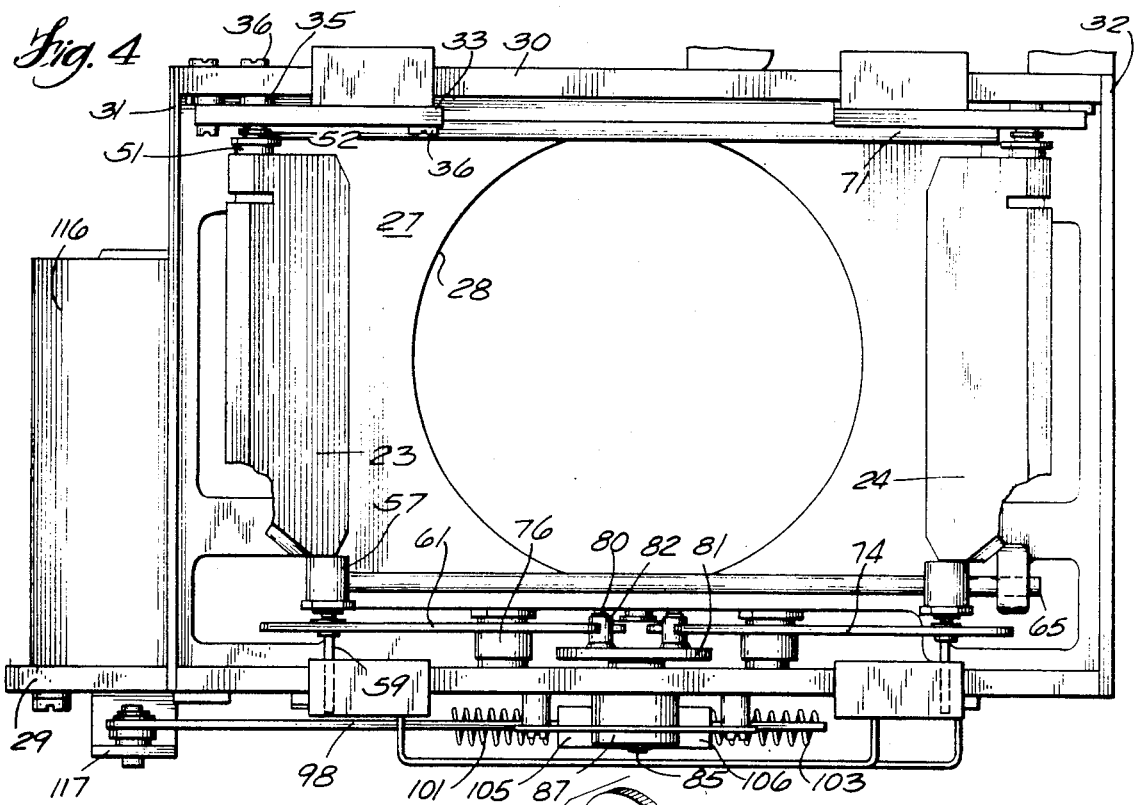
FIG. 4 is a top plan view of the image gate shown in FIG. 2.

As can be seen in FIG. 3, supported from front wall 29 of the image gate housing is another guide track element 41 which is identical to element 33 that has just been described. Guide track element 41 is mounted on spacer posts 42 and secured with machine screws such as 44. The curved slots of opposite front and rear guide track elements 41 and 33 are congruent with each other.

In FIG. 3 one may see that the top end of mirror 23 is attached or cemented to a sheet metal mirror holding element 45 to which a socket such as 48 and 51 is fastened on its backside. A shaft 49 extends from the socket 48 and has a small bearing 50 mounted on its end. The bearing extends into curved slot 39 in the front guide track element 41. The socket 51 is similarly fastened opposite socket 48 and it has a shaft 52 on which is mounted a bearing which extends into curved slot 39 in guide track element 33. These laterally extending shafts 49 and 52 and the bearings at their ends serve as a follower means for guiding the mirror as it is being transferred from parked to active position along the curved slots in the guide track elements.

As can be seen in FIG. 3, the lower end of the mirror is cemented or attached to a sheet metal mirror holder element 54 which connects with a cross member 56. Fastened to the front left of the sheet metal mirror holder 54 is a socket 57 and there is a similar socket 58 fastened to the front right of the mirror holder. A shaft 59 extends from socket 57, and where it passes through an elongated longitudinal guide slot 60 in a mirror transfer lever 61, shaft 59 is provided with an axially fixed but rotatable shoulder bearing 62 which together with shaft 59 constitutes a follower which follows in slot 60. It will be evident from inspecting FIG. 2 that when transfer lever 61 is swung, it will cause the lower end of mirror 23 to move to the right while follower bearing 62 reciprocates along slot 60. Thus, it is the swinging of lever 61 in a clockwise direction that transfers the left mirror 23 from its parked position to its active position in which it is identified by 23' when it is diagonally across the optical beam path which projects from the objective lens barrel 12 that extends upwardly through aperture 28 in the bottom of the image gate housing. Note that there is only one driving point for mirror 23 and that is where bearing 62 extends into slot 60 of transfer lever 61.

In FIG. 2 one may see that the lower end of the mirror is guided along a horizontal plane on straight guide rods, the front one of which is marked 65. Each guide rod is supported on an upstanding post 66 which is suitably apertured to receive the end of the guide rod and the rod is prohibited from sliding endwise by pins such as 67. The rear straight guide rod is parallel with rod 65 and is marked 71. Its end is particularly visible in FIG. 3.

As can be seen in FIG. 3, there are stub shafts 68 and 69 extending laterally from cross member 56 of the lower mirror mounting. Shaft 68, for example, extends into a Delrin sliding bearing 70 which can be seen in profile in FIG. 2. Delrin sliding bearing 70 has a suitable bore to permit it to slide on rod 65 lengthwise of the image gate housing. This guides the lower end of the mirror 23 on a definite horizontal line when transfer lever 61 is swung clockwise from its position in FIG. 2.

The end of rear cross guide rod 71 is particularly visible in FIG. 3 where the post which supports the guide rod has been removed to show the nature of the rear sliding bearing 72. Note that whereas the front sliding bearing 70 has a bore for capturing and sliding along front rod 65, the rear sliding bearing 72 merely slides along in tangential contact with rod 71. This prohibits any binding of the sliding bearings which might occur as a result of the mirror being translated by driving it only from its front end by means of transfer lever 61. When the mirror is shifted from juxtaposition with the optical path to its diagonal position across said path as indicated by 23' in FIG. 2, the front sliding bearing 70 comes to a stop against its resting counterpart 73 on which the other mirror 24 slides. Likewise, the rear sliding bearing 72 abuts against its counterpart on mirror 24. The components of force developed against the mirror interaction with the transfer lever 61 and the curved guide track slot 39 are such that the sliding bearings are finally jammed against their unmoved counterparts. The rear tangentially sliding bearing 72 is thereby held in good contact relationship with cross guide rod 71 when the mirror is in its final diagonal position. This means that the mirror will be transferred to a reproducible position each time it is shifted to its diagonal position regardless of image gate orientation.

Note that the lower edge of each mirror is beveled as indicated by the numeral 75 on mirror 23. This is because the barrel 12 of the objective lens of the image intensifier extends upwardly through the bottom of the image gate such distance that it would interfere with the mirror's movement if its lower edge were not beveled. When the mirror is shifting over barrel 12, it is moving on an essentially horizontal line since it is guided on its lower end by cross guide rods 65 and 71 during its entire range of travel.

As indicated earlier, the left mirror 23 is shifted by swinging mirror transfer lever 61 clockwise as viewed in FIG. 2. Similarly, the right mirror 24 is shifted by rotating its transfer lever 74 counterclockwise as viewed in this figure. Mirror transfer levers 61 and 74 are similarly constructed and operated so attention will be focused on lever 61 in the following explanation.

Transfer lever 61 is journaled for swinging on a stub shaft 76 which extends rearwardly from front wall 29 of the image gate housing. Lever 61 is retained on stub shaft 76 by a bearing shoulder screw 77 which can be seen in profile in FIG. 3. The lower or driven end of lever 61 has an open ended slot section 78 which is arced along a radius identical to that of the drive pin bushing 82 on a fan shaped link 81 and another section 79 which extends toward the pivot point of mirror transfer lever 61. These continuous slot sections are somewhat analogous to the slots in a geneva gear and produce the effect of causing the mirror to be translated rapidly through the intermediate portion of its travel and to decelerate the mirror as it approaches its final diagonal position. This results in less shock and vibration when the mirror is transferred.

Lever 61 may be swung clockwise to transfer mirror 23 to its diagonal position by engaging it in its slot sections 78 and 79 with a drive pin 80 which extends from the back of a fan shaped link 81. Pin 80 has a bushing 82 journaled and retained on it so as to make rolling engagement with continuous slot 78, 79 in the transfer lever 61. Fan shaped link 81 has a hub 83 which is retained on and journaled for rotation on a stub shaft 84 which extends from the back of front wall 29 of the image gate housing. Extending frontward or to the left in FIG. 3 is a pin 85 on which there is a shoulder 86. Pin 85 extends through some Delrin blocks 87 and 88 which constitute a drive member for fan shaped link 81. These blocks are V-shaped on top for the purpose of camming an adjacent limit switch. An exploded view of the mechanism just described is shown in FIG. 5 where the relationship of the parts may be seen more clearly.

Figure 5:
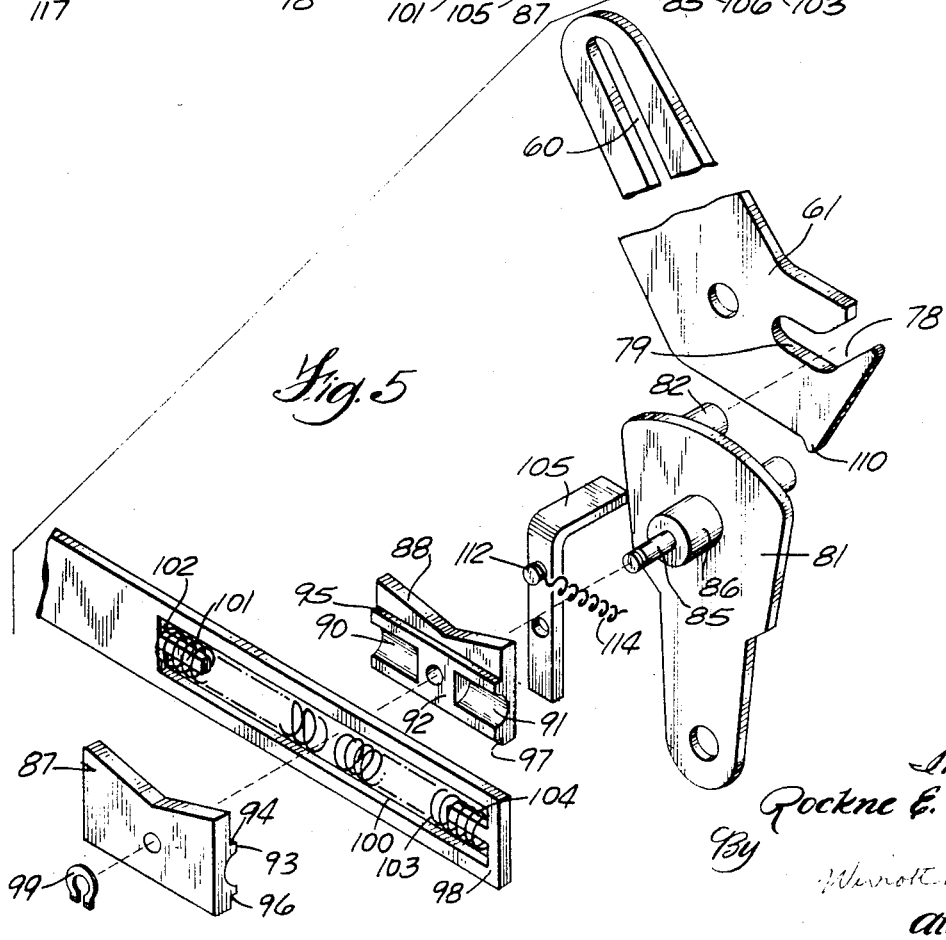
FIG. 5 is an exploded perspective view of part of the mirror transfer mechanism.

The Delrin block 88 can be seen in FIG. 5 to have endwise spring retaining semi-cylindrical bores 90 and 91 which mate with their counterparts in block 87 to form a cylinder. The inside faces 92 and 93 of the blocks have upper grooves such as 94 and 95 and lower grooves 96 and 97 which permit the faces 92 and 93 to abut when the blocks are positioned against a slotted bidirectionally shiftable actuating link 98. When the snap ring 99 is in position on the end of pin 85 the block sections 87 and 88 are clamped thereon but the actuating link can yield slightly with respect to the blocks because the edges of link 98 fit loosely in the slot created by abutting shoulders of grooves 94 – 98 in the blocks. Bidirectional translating force is transmitted from actuating link 98 to the blocks and to fan shaped link 81 by a pair of springs 101 and 103. These springs extend into cylindrical bores 90 and 91 in the blocks at one end and react against the ends 102 and 104 of slot 100. Thus, upon inspecting FIG. 5, it will be evident that when actuating link 98 is shifted to the right, the force transmitted through spring 101 will urge the blocks to the right and cause fan shaped link 81 which is pinned through the blocks to rock clockwise. When actuating link 98 is shifted to the left as viewed in FIG. 5, the spring 103 will transmit driving force to the blocks and fan shaped link 81 will rock counterclockwise. Since the mirrors are transferred from parked to active position in 0.5 second or less, it is important for the purpose of shock absorption in the whole system to have springs 101 and 103 interposed between motor driven actuating link 98 and the fan shaped link 81 which drives mirror transfer levers 61 and 74 in selected alternate directions.

Both of the transfer levers 61 and 74 are normally locked to prevent mirrors 23 and 24 from shifting from their parked positions toward their active positions under the influence of gravity. This enables the image gate to be used in a horizontal or vertical attitude as desired. As can be seen particularly well in FIGS. 2, 3 and 5, the locking means comprise L-shaped levers 105 and 106 which are journaled on stationary shafts 107 and 108. As can be seen in FIG. 3, L-shaped lever 105 has a hub 109 which is journaled on its stationary shaft 107. The other lever 106 is similarly constructed. At its lower end, transfer lever 61 has an apex 110 which constitutes a stop. As can be seen in FIG. 2, the apex 110 normally bears on the laterally extending leg of L-shaped lever 105 and prevents transfer lever 61 from swinging accidentally. The other transfer lever 76 has a similar apex 111 which normally bears on the laterally extending leg of transfer lever 106 to prevent transfer lever 74 from swinging accidentally. Pins 112 and 113 extend from the respective L-shaped stop levers 105 and 106. A tensioned coil spring 114 is connected between pins 112 and 113 so as to bias the stop levers toward each other. Stop levers 105 and 106 are stopped from moving toward each other so they are normally held in an upright position as in FIG. 2. When the fan shaped link 81 is rocked counterclockwise, for example, it will abut the laterally extending leg of L-shaped lever 105, and drive this lever out from under apex 110 of clockwise movable transfer lever 61. This will free the transfer lever 61 for being swung which occurs, of course, because the pin and bushing 82 on the back of the fan shaped link will advance in slot 78 of the transfer lever and cam it clockwise. However, at the same time, the right stop lever 106 will be restrained in its position under apex 111 in which case the other transfer lever 74 will be prohibited from swinging. The converse action takes place when fan shaped lever 81 is swung clockwise for the purpose of driving transfer lever 74 counterclockwise to shift its associated mirror 24. That is, stop lever 105 will remain in a position where it interferes with apex 110 of transfer lever 61, prohibiting it from swinging.

As indicated earlier, fan shaped link 81 may be rocked counterclockwise as viewed in FIG. 2 to cause transfer lever 61 to rock clockwise and the link 81 may be rocked clockwise to cause the other transfer lever 76 to rock counterclockwise and position its associated mirror in the beam path. It has also been explained that springs 101 and 103 are used as the force transmitting elements between actuating link 98 and the fan shaped link 81. The driving force for actuating link 98 is derived from a reversible motor 116 which has an arm 117 interconnecting its crank shaft 118 and actuating link 98. In this design, arm 117 is driven about 28° to transfer the selected mirror to its diagonal position. The motor is continuously energized but stalled to hold the mirror in active position. The motor circuit is opened by a limit switch when the mirror is returned to parked position.

Since only one motor is used to drive the two semitransparent mirrors 23 and 24 in opposite directions, it is necessary to have an electric logic circuit, not shown, which controls the positions of the mirrors and which prevents conflicting control signals from being applied to the motor. Limit switches 119, 120, and 121 are provided for these purposes. Limit switches 119 and 120 are adapted to stop the motor instantly so as to stop motor inertia from driving link 81 past its center or rest position when the associated mirrors are in the parked position. Limit switch 121, on the other hand, prevents excessive power from being applied to motor 116 while it is stalled. The relays and other circuit elements for controlling the motor 116 are not shown since they may be devised routinely by an electric logic circuit designer.

To recapitulate operation of the new image gate, power is applied to drive motor 116 in a selected direction. Actuating link 98 acting through either spring 101 or 103 urges fan shaped link to swing in the selected direction. One of the pins extending from the fan shaped link cams along the angularly related slots 78 and 79 of the transfer lever, causing the latter to rock and drive its associated mirror from substantial juxtaposition into a diagonal position in the image beam path. The cam surfaces 78 and 79 of the transfer levers are so angularly related that the transfer lever first accelerates rather slowly, then reaches maximum speed at the center of its travel, and finally decelerates at a slower rate so that shock to the system is minimized when the mirror reaches its active diagonal position, where motor stall holds the mirror in place. The drive pin 82 on the fan shaped link 81 reacts against slot 79 in the transfer lever when the link is swung to drive the lever back to parked position. The mirror is restored to its parked position by driving motor 116 until arm 117 is restored to its neutral position as seen in FIG. 2. When one transfer lever 61 is swung, the other 74, for example, is locked in its parked position by stop lever 106. Conversely, when transfer lever 74 is swung, transfer lever 61 is locked by stop lever 105. When a mirror has reached its active position, its sliding bearings on the cross rods abut the stationary sliding bearings of the other mirror in which case the mirror which has been transferred is firmly held in its active position in proper alignment. During the positioning procedure, the mirrors are first swung arcuately downward to clear the lens barrels and assume a diagonal attitude after which they are urged straight into their final position along a horizontal line. The image gate is distinguished by being adapted to operate mirrors bidirectionally with a single motor and by operating equally well in vertical, inverted, horizontal or any position.

Although a preferred embodiment of the invention has been described in considerable detail, such description is intended to be illustrative rather than limiting, for the invention may be variously embodied and is to be limited only by interpretation of the claims which follow.

I claim:

1. An image gate for directing the optical image beam from an x-ray image intensifier from its beam path to alternate selected paths such as to various cameras, said image gate comprising:
   a. a mirror means which is normally parked in juxtaposition to the optical image beam path and near the plane where the optical image emerges from the intensifier,
   b. support means,
   c. a curved guide track means mounted on said support means adjacent an edge of said mirror means and defining directional components of movement for the mirror means when it is transferring from substantial juxtaposition to a diagonal position across said beam path,
   d. guide track follower means extending laterally from the mirror means into sliding engagement with said curved guide track means,
   e. straight guide means extending generally in the direction in which the mirror travels across the beam path,
   f. bearing means mounted on said mirror means near an end remote from said follower means, said bearing means being adapted to translate on said straight guide means,
   g. a mirror transfer lever means pivotally mounted on said support means for swinging in the general direction in which said mirror means is moved, said transfer lever means being coupled with said mirror means intermediately of said follower means and said translatable bearing means.

2. The invention set forth in claim 1 wherein:
   a. said curved guide track means includes a continuous straight section extending in parallel with the said straight guide means, the said follower means when moving in said straight section advancing the mirror means rectilinearly in cooperation with said straight guide means.

3. The invention set forth in claim 1 wherein:
   a. said transfer lever means has an elongated slot means remote from the pivotal mounting thereof, and
   b. there is a mirror driving follower means extending from said mirror means into said elongated slot means, the said driving follower means extending from said mirror means at a location which is intermediate said curved guide track follower means and the slidable bearing means which cooperates with said straight guide means.

4. The invention set forth in claim 1 including:
   a. a bidirectionally swingable power driven link means in driving relation with said transfer lever means,
   b. said transfer lever means having a slot means comprising two angularly related slot sections and said link means having a drive pin means extending into said slot means, whereupon when said link means is swung the camming action between said pin means and the different sections of said slot means will swing said transfer lever means at varying rates of acceleration and deceleration.

5. The invention set forth in claim 4 including:
   a. stop means engageable with said transfer lever means to hold the same in a position which corresponds with the mirror means being parked in juxtaposition to said optical image beam path,
   b. said stop means being actuable in response to movement of said driving link to release said transfer lever means for swinging to transfer said mirror means to a diagonal position across the beam path.

6. The invention set forth in claim 5 wherein:
   a. said transfer lever means has an integral stop means engageable surface,
   b. said stop means comprises a pivotal lever means a part of which is normally spring biased into interfering relation with said stop means engageable surface, and
   c. said power driven link means being adapted to urge said stop means out of interfering relation with said stop means engageable surface in opposition to said spring bias when said link means is pivoted to drive said transfer lever means, whereupon said mirror means will not shift accidentally when said image gate is in any attitude.

7. The invention set forth in claim 1 including:
   a. a power driven link means that is adapted to pivot through an angle during which time it engages and swings said transfer lever means,
   b. an actuating element for pivoting said power driven link means,
   c. a spring means interposed between said actuating element and said driven link means for transmitting force from said element to said driven link means, whereby to absorb shock when said transfer lever means is swung to transfer said mirror means in either direction.

8. The invention set forth in claim 7 wherein:
   a. said actuating element comprises a rectilinearly and bidirectionally movable actuating link means,
   b. a pair of springs having their corresponding opposite ends reacting against said actuating link at spaced apart points and their other corresponding ends acting on said driven link means,
   c. a reversible motor means,
   d. a crank link means pivotally connected between said actuating link means and said motor means, said crank link means being adapted to turn through a limited angle in either direction whereby to swing said driven link means through the agency of said spring means.

9. The invention set forth in claim 1 wherein:
   a. said support means comprises a housing means having top and bottom openings aligned with said optical image beam path and at least one side opening displaced from said path,
   b. objective lens means extending through said bottom opening into said housing,
   c. television camera lens means extending into said top opening, and
   d. camera lens means extending into said side opening, and e. said juxtaposed mirror being movable on said curved guide track means and simultaneously on said straight guide means so that the mirror means attains a diagonal attitude and finally moves rectilinearly during at least a part of the travel of the mirror means across the objective lens means.

10. An image gate for directing the optical image beam from an X-ray image intensifier selectively to cameras which are respectively located on the axis of the image beam and at right angles thereto, said image gate comprising:

a. a box-like housing having side, top and bottom openings,
   b. at least two semitransparent mirror means juxtaposed to opposite sides of said optical beam path inside of said housing,
   c. a pair of guide means associated with each mirror means respectively, said guide means having guide track slots which each have a curved section for guiding the mirror means relatively downwardly into a diagonal attitude and each have a continuous straight section for translating the mirror means rectilinearly during part of its travel across said beam path,
   d. follower means extending laterally from opposite edges of each mirror means into said guide track slots,
   e. a pair of straight elongated guide means extending in the general direction in which said mirrors are translated,
   f. bearing means mounted on said mirror means at an end that is remote from said follower means, said bearing means being adapted to translate on said straight guide means,
   g. a mirror transfer lever means for each mirror means being pivotally mounted in said housing means for swinging in respectively opposite directions in a plane which parallels the general direction of mirror means movement, each of said transfer lever means making a sliding connection with said mirror means at a point intermediate said follower and said beaming means, and
   h. a power driven pivotally mounted bidirectionally swingable drive pin means which selectively engages respective transfer lever means to shift an associated mirror means between juxtaposed and diagonal positions.

11. The invention set forth in claim 10 wherein:

a. each transfer lever means has in one end an open slot in which said pin means travels to cam said transfer lever means and swing the same.

12. The invention set forth in claim 11 wherein:

a. said open slot is in two sections which are at an angle to each other, whereby said transfer lever means are swung at variable angular acceleration and deceleration rates during transfer of the mirror means.

* * * * *